Feb. 20, 1973  G. W. ZIEGLER, JR  3,716,904
COAXIAL STAK. FOR HIGH FREQUENCY CABLE TERMINATION
Original Filed Dec. 11, 1967  3 Sheets-Sheet 1
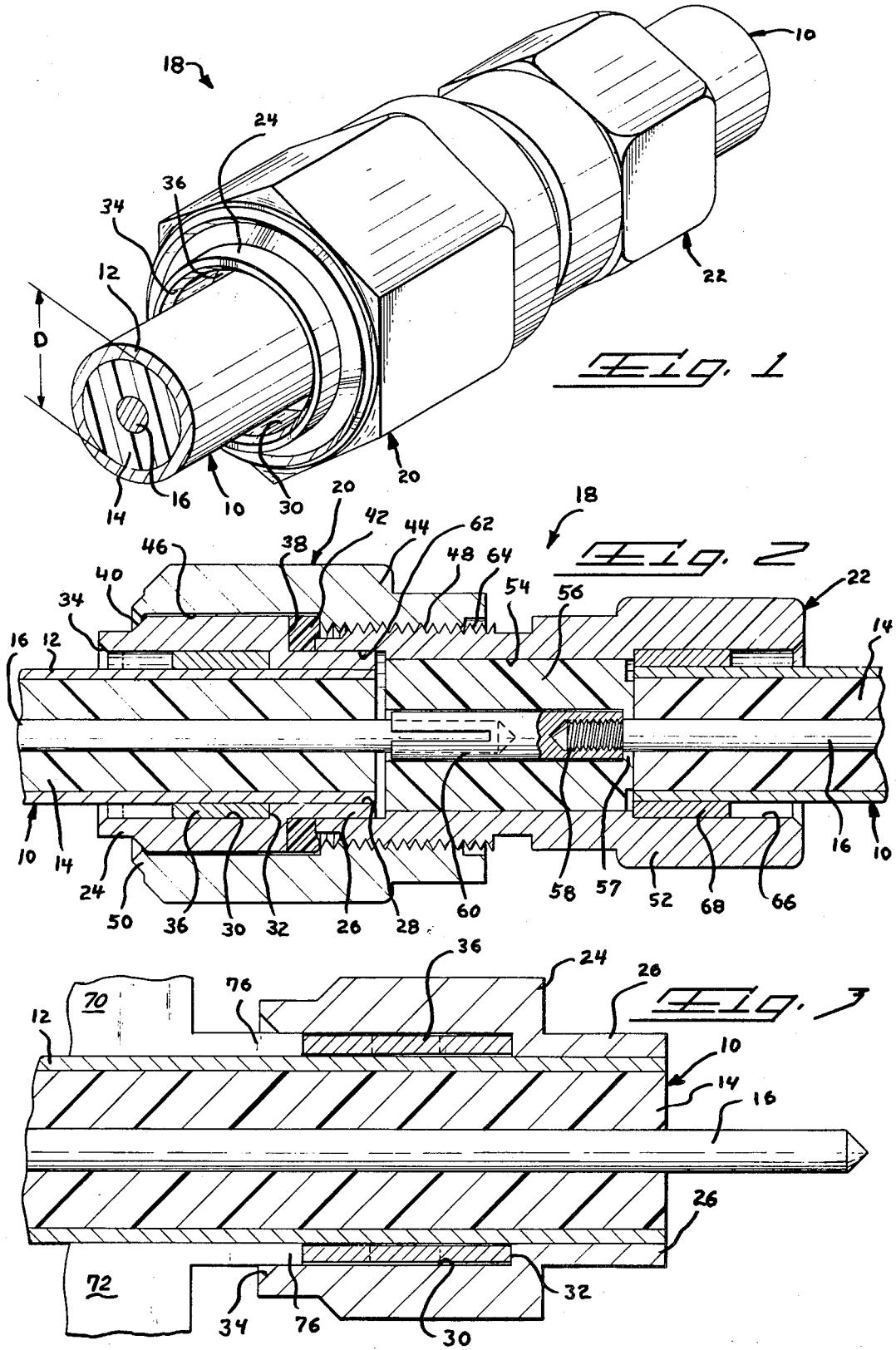

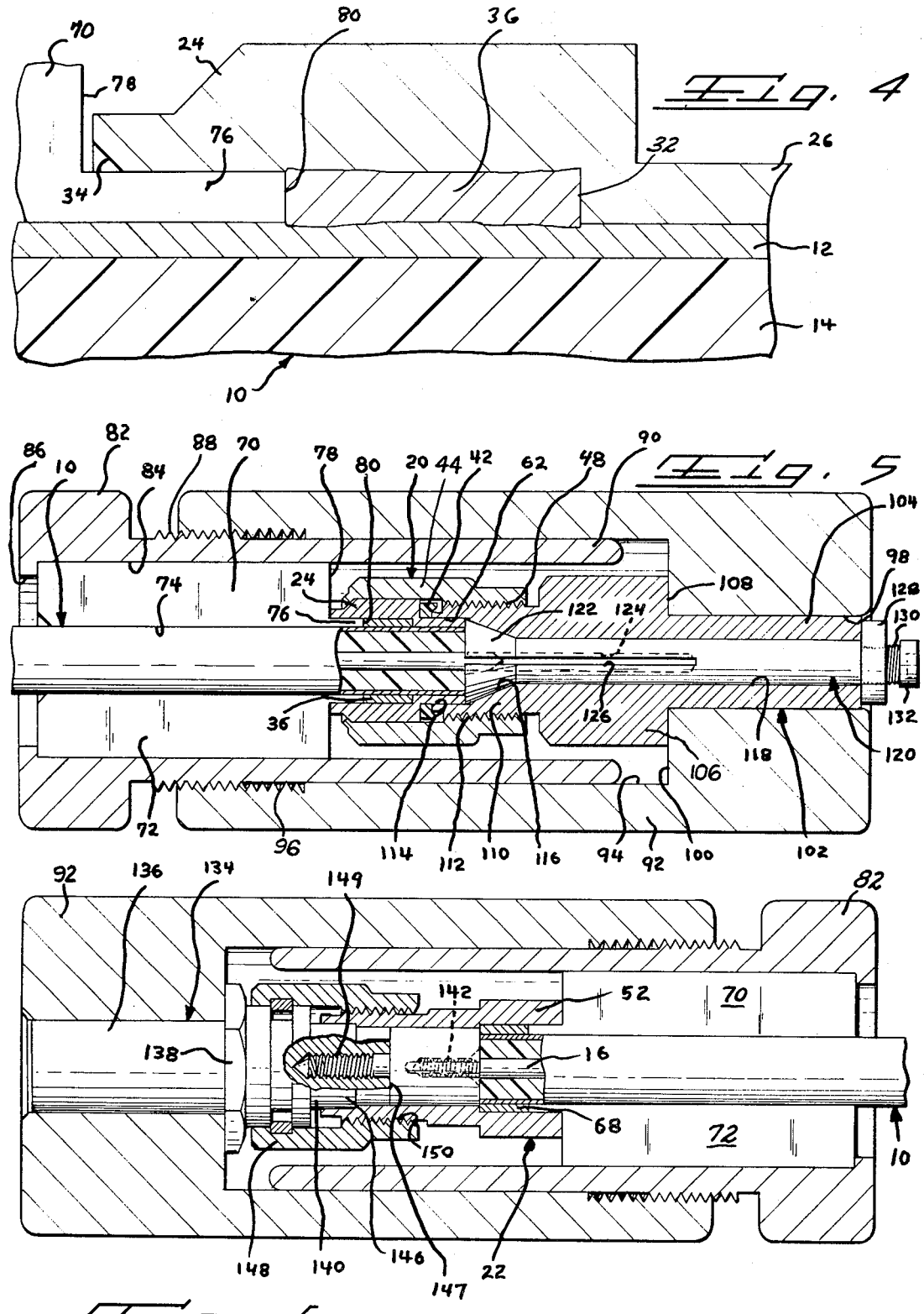

United States Patent Office 3,716,904
Patented Feb. 20, 1973

3,716,904
COAXIAL STAKE FOR HIGH FREQUENCY
CABLE TERMINATION
George W. Ziegler, Jr., Carlisle, Pa., assignor to
AMP Domestic Inc.
Original application Dec. 11, 1967, Ser. No. 689,649, now
Patent No. 3,533,051. Divided and this application June
5, 1970, Ser. No. 57,393
Int. Cl. H01r 7/06
U.S. Cl. 29—203 H                        6 Claims

ABSTRACT OF THE DISCLOSURE

A connector and method of connection for high frequency coaxial cable is disclosed featuring a soft ferrule driven by dies to expand inwardly and outwardly as it is compressed axially through inelastic deformation to develop hoop stresses in a center tubular portion of a connector and in the outer conductor of the cable. The length and thickness dimensions of the ferrule relative to the diameter of the cable outer conductor are controlled to provide a broad area of contact between the stressed elements to provide a permanent sealed termination with minimized cable deformation. The connector structure is arranged to facilitate a ready measurement of the extent of ferrule deformation to ascertain proper installation.

This application is a division of application, Ser. No. 689,649, filed Dec. 11, 1967, now Pat. No. 3,533,051.

BACKGROUND OF THE INVENTION

One of the problems in terminating coaxial cable of the type utilized to carry high frequency signals is tied to a necessary limitation upon deformation and damage to the cable which can result in degradation of signals carried by such cable. With crimp type terminations of one form used in the prior art, deformation is usually limited by the provision of a back-up ferrule having an inner diameter approximately the same as the inner diameter of the outer conductor of the cable and strength characteristics to resist deformation in the zone of crimp caused by the application of deforming forces to a metallic ferrule positioned over the cable outer conductor and over such ferrule. With coaxial cable of the type which has a solid metallic outer conductor typically in the form of copper or aluminum tube the use of a back-up ferrule is made more difficult because the insertion of a back-up ferrule into the cable without an enlargement of the outer conductor it will necessarily introduce a reduction in the inner diameter of the outer conductor in the region of the ferrule, creating a discontinuity. Flaring or enlarging the cable outer conductor to permit the use of a back-up ferrule having an inner diameter equal to that of the cable outer conductor is readily possible with many cable sizes but becomes more difficult with cables of smaller sizes such as cables on the order of a quarter inch and less in outer diameter.

The use of collets having interior serrations or teeth and driven to bite into the cable outer conductor and thus provide a mechanical gripping action is yet another solution employed in the prior art. As with crimping techniques, if a back-up ferrule is not employed there is considerable likelihood that excessive cable deformation will result. Additionally, collets made in accordance with the more usual prior art practice are split lengthwise to permit radial collapse and thus do not provide a seal to the termination being made.

Because of the foregoing problems with crimp and collet type termination devices, the prior art has usually turned to solder for the smaller sizes of coaxial cable. Aside from the increased time of application and the requirement of soldering skills, cable damage can occur due to melting of the cable dielectric support in the region of the cable heated by the soldering operation. Dielectric damage from excessive heat can cause discontinuities which can be detected only by observing a loss in electrical performance of the termination or by destructive inspecting. Even with crimp or collet type coaxial connectors there is a problem with ascertaining quality of connection by any of the standard techniques such as gauging, in the manner used for non-coaxial terminations. The problem is not solely one of inaccessibility of the region of connector-able interface. With high frequency signals having contimeter or smaller wavelengths the usual connector termination structure can result in deviations which, although too small to be readily observable or practically measurable in the field are sufficient to preclude low loss signal transfer.

SUMMARY OF THE INVENTION

The present invention relates to a connection device, tooling and a method for terminating coaxial cable of the type utilized to carry high frequency signals; particularly as applied to cable in the smaller sizes wherein normal manufacturing tolerances are an appreciable portion of the dimensions involved and of the wavelength of signals accommodated by the device in use.

It is an object of the invention to provide a technique and means for terminating coaxial cable which minimizes cable distortion and damage while loosening assembly tolerances. It is a further object to provide a method and means for terminating very small coaxial cable in a manner assuring adequate pull-out strength without excessive cabled deformation and incident signal distortion. It is yet a further object to provide a simple and inexpensive termination device for high frequency coaxial cable which can be reliably applied under field conditions. It is another object to provide a coaxial connector device and tooling therefor which permits visual inspection and/or gauging after termination to yield a nondestructive indication of proper application.

The invention contemplates a method of termination of coaxial cable of the type having a metallic tubular outer conductor which is positioned within a bore in a connector body of a diameter appreciably greater than the outer diameter of the cable. A cylindrical and preferably seamless ferrule of ductile material dimensioned to substantially fill the space surrounding that portion of the cable outer conductor fitted within the bore is then positioned in such bore over the cable. The ferrule is then driven axially by tooling dies through an inelastic deformation to expand radially outwardly and inwardly working against the inner surface of the connector bore and the outer surface of the cable positioned therein. This results in permanent residual stresses in the material of the connector body and in the material of the outer conductor of the cable to mechanically and electrically join the cable to the connector body. Deformation of the ferrule is controlled to minimize deformation of the cable outer conductor to avoid creating discontinuities and incident signal loss in the region of deformation. The axial length of the ferrule prior to axial deformation is, in accordance with the invention, made to be quite substantial relative to the wall thickness of the ferrule in order to provide a broad area of engagement with portions of the connector body and the outer conductor of the cable. The connector bore length is limited to permit visual examination and/or gauging of the extent of deformation of the ferrule once tooling dies are removed. One embodiment features an inspection part for inspection purposes.

Application tooling for applying the ferrule to a connector body and cable features a set of die halves having portions which together extend around the periphery of the cable outer conductor in the region of the connector bore. A die driving sleeve is provided which is mateable with a member fitted against the end of the cable and made to grasp the center conductor thereof with relative movement being provided by operation of such tooling to effect axial loading of the ferrule and the deformation previously mentioned. In a preferred embodiment the tool includes features limiting the extent of deformation of the ferrule and means to exactly position the connector body and cable elements relative to each other to better assure adequate and consistent mechanical and electrical performance of the connector device.

In the drawings:

FIG. 1 is a perspective showing a coaxial connector including plug and jack halves secured to the ends of coaxial cable which ends are joined together mechanically and electrically by the connector device;

FIG. 2 is a sectional view of the device of FIG. 1;

FIG. 3 is a sectional view of a portion of the device of FIG. 1 prior to deformation of the ferrule thereof and with die members in position for effecting such deformation;

FIG. 4 is a view similar to that of FIG. 3, but following deformation by reason of die displacement;

FIG. 5 is a cross-sectional view showing a tool assembly and elements thereof in position and following the staking of the ferrule to one half of the connector device of FIG. 1;

FIG. 6 is a longitudinal and sectional view of tooling elements in a position of use following staking of a ferrule to connect cable to the other half of the device of FIG. 1;

COMPONENT DESCRIPTION

Figure 7:
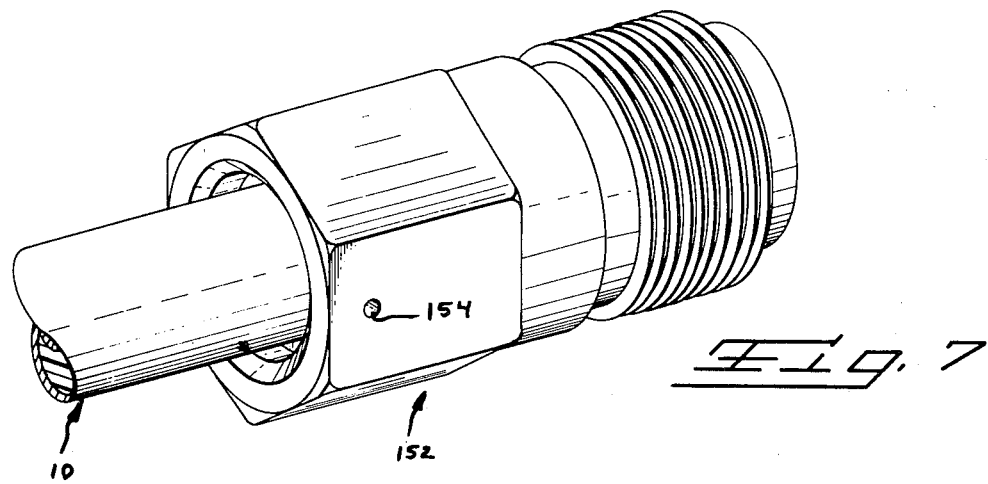
FIG. 7 is a perspective view of an alternative version of the connector of the invention featuring an inspection part.

Referring now to FIG. 1, the coaxial cable shown as 10 includes an outer conductor 12 and contained therewithin a solid dielectric sheath 14 surrounding a solid center conductor 16. Cable of this type is frequently referred to as semi-rigid coaxial cable and is utilized to carry radio frequency signals extending into the multi-gHz. range. In the medium and larger sizes, cable of this type may include a center conductor of hollow copper tubing surrounded by a dielectric material of formed polyethylene, in turn surrounded by an outer conductor of aluminum tubing. In the smaller sizes, cable of this type the cable center conductor may be a solid rod of copper surrounded by a dielectric material of Teflon, in turn surrounded by copper tubing. In the smaller sizes of coaxial cable the outer diameter of the outer conductor may be on the order of one-quarter inch or smaller with the thickness of the outer conductor tubing being on the order of 0.010 inch. While it is contemplated that the present invention, in different sizes, may be utilized to an advantage with cables of different sizes the invention device, tooling and method has been found particularly applicable to cable of the smaller sizes mentioned. One of the particular advantages attained through the use of the invention is that application tolerances can be better controlled than with many other techniques. With smaller coaxial devices, tolerances are such a significant portion of cable diameter and therefore of a given connector as to be substantially more critical than is the case with larger sizes. One of the critical dimensions is the diameter of the inner surface of the outer conductor shown as D in FIG. 1 within the connector. It is important to avoid or at minimize any change in this dimension created by the technique and structure of the connector device. It is also important to avoid changing the effective dielectric constant of the medium between the outer surface of the inner conductor 16 and the inner surface of the outer conductor 12. Changes in 14 may result from heat applied to the device or to the cable as would be the case with soldering, brazing, welding or the like. The worst aspect of changes of this latter type is one of variability, depending upon the habit or skill of the fabricator, coupled with the fact that excessive damage to the dielectric material will not be apparent, since the dielectric material is covered over completely by the cable outer conductor in the region of damage. This means that a connector which may adequately hold in terms of mechanical pull-out relative to the connector device will, nevertheless, result in poor electrical performance which can be ascertained only by electrical measurements of performance. With high frequency devices electrical performance measurement is typically accomplished by rather complicated test equipment through a series of rather precise measurements.

In accordance with the invention concept a termination of the type of cable shown in FIG. 1 is provided through a structure which eliminates the possibility of damage to dielectric material by reason of applied heat or the like and which minimizes and better controls deformation of the cable caused by application of the device.

Referring to FIGS. 1 and 2, an illustrative embodiment of the invention is depicted in the form of a connector assembly 18 including a connector half 20 and a connector half 22, which are intermatable to electrically and mechanically join the ends of coaxial cable 10 together and thereby define a coaxial transmission path for high frequency signals carried by the cable. It is to be understood that the invention contemplates a use as a termination of coaxial cable to transmission paths defined by other than the coaxial cable. For example, an invention device may be utilized to terminate a coaxial cable like 10 to a circuit having a strip-line or other signal path structure connected into some circuit apparatus either receiving or supplying signals propagated by the coaxial cable. In other words, the invention is contemplated as being fully applicable to only one-half of the structure shown in FIGS. 1 and 2, or the equivalent thereof in the various forms of bulkhead fittings, adaptors, loads and the like. It is also fully contemplated that the invention structure may be incorporated in a splice which once attached to cable ends remains as a permanent connection of coaxial cable without the disconnect feature included in the structure shown in the present application.

Referring now in more detail to the connector 18, half 20 includes a body 24 having a forward portion 26 containing a bore 28 of a diameter to receive in sliding engagement the outer conductor 12 of cable 10. Adjacent bore 28 is a counterbore 30 ended in a right-angle stepped surface 32 and opening opposite thereto through an outwardly flared portion 34. Counterbore 30 has a diameter sufficiently larger than that of the outer diameter of 12 to accommodate a ferrule 36 depicted in FIG. 2 in its deformed configuration by the solid lines and in its undeformed configuration by the dotted in vertical line. The deformation depicted in FIG. 2 and in other figures is slightly exaggerated for the purpose of making clear the action of the ferrule in developing holding and terminating stresses in the body 24 and in the cable outer conductor 12. The ferrule 36 is in a preferred embodiment formed out of a ductile material such as annealed copper and is in accordance with the invention dimensioned prior to deformation so as to substantially fill the space between the outer surface of the cable outer conductor 12 and the surface of bore 30; the dimensions being controlled to permit the ferrule to be readily pushed into the bore with the body 24 in position on the cable. Further details as to a preferred ferrule construction will be given hereinafter in the description of the application thereof and of application tooling therefor.

On the outside of body 24 toward the forward end is a step 38 and toward the rear is a reduced portion including a surface 40 tapered inwardly. An element in the form of a ring shown as 42 is provided surrounding a portion of the body and positioned against surface 38. The element 42 is preferably of plastic insulating material having sufficient resiliency so as to seal the connector interface through an engagement with the leading end of the opposing half of the connector. This engagement is depicted in FIG. 2. Element 42 also serves the purpose of retaining a nut shown as 44 on the body 24. The nut includes a bore 46 so as to be slidably and rotatably mounted on 24 and the forward portion of 44 includes an internal threading shown as 48. The rear portion of 44 is turned inwardly as at 50 so as to present a surface engageable with surface 40 of the body to hold the nut against movement to the right relative to 24 and thus permit the connector halves to be mechanically joined together. The outside of the nut is, as shown in FIG. 1, provided with surfaces to facilitate assembly of connector halves with a standard wrench.

The opposing half of the connector 22 includes a body shown as 52 having a central bore 54 in which is fitted a dielectric insert 56, itself bored to receive and contain a center contact member 58. The center contact member 60 may, in a preferred embodiment, take the form shown in FIG. 2 to include at one end a split portion to define a spring contact for engagement with the center conductor of the cable as terminated in half 20 of the connector. At the other end contact 60 may be in turn threaded to receive a threading applied to the center conductor of half of cable 10 as terminated by half 22 of the connector. In accordance with the preferred embodiment the insert 56 includes a portion 57 positioned to catch one end of the center contact and limit the contact against rightward displacement.

The body 52 of half 22 includes a bore at the forward end shown as 62, having an inner diameter to slidingly fit over the outer diameter of the forward portion 26 of the jack half of the connector. Bore 62 is made of a depth so as to avoid bottoming of the end of 26 against portions of 52 so as to permit the forward end of 52 to bear against element 42. The forward end of 52 includes on the exterior surface threading shown as 64 adapted to mate with the threading 48 of the nut of half 20 of the connector.

A further bore 66 is provided in 52 to the rear thereof. This bore is essentially like that in the plug half in terms of accommodating a ferrule 68 identical to the ferrule 36 used in half 20. It is to be noted that with regard to half 22, bore 66 is of a diameter relative to bore 54 so as to leave an end portion of ferrule 68 exposed within bore 54 and free of engagement with the material of 52 except on the outer edge. Ferrule 68 in half 22 thus becomes part of the conductive surface of the outer conductor structure of the connector, a point on which a more detailed comment will be made later on in the description of the preferred embodiments of the invention. As shown in FIG. 1, the body 52 includes flat surfaces enabling the half to be held by a standard wrench.

In accordance with the embodiment of the connector shown in FIG. 2, the characteristic impedance of the transmisison path defined by the cable and connector is maintained substantially constant up to the point in the halves wherein the center conductor of the cable extends out of the cable. Throughout the portion between the ends of the cable halves suitable adjustment and/or compensation to the characteristic impedance of the cable is provided by a control of the dimensions of the inner and outer conductive surfaces and the dielectric medium between such surfaces.

Referring now to FIGS. 5 and 6, application tooling in accordance with a preferred embodiment will now be described. FIG. 5 shows such tooling as applied to half 20 of a connector 18, including a pair of die elements 70 and 72 which are identical and which each include an inner surface such as 74 shown with respect to the upper element 70, which is dimensioned to extend around 180° in engagement with the outer conductor 12 of the cable. When the two die elements are placed together in the position shown in FIG. 5, the cable outer conductor and thus the cable is entirely surrounded by portions of the die elements. At the right end of each die element is a projecting portion such as 76 shown with respect to the upper element 70 having an outer diameter and configuration to fit within the bore 30 of the body 24 of half 20 of the connector. The portion 76 joins the main body of the element 70 at a transverse face 78 which is precisely spaced relative to the end and engaging surface 80 of the die element. This spacing precisely limits the degree of insertion of portion 76 within the body 24 and thereby precisely limits axial deformation of ferrule 36.

The outer surface of each die element is made to fit within a sleeve member 82 having a bore 84 dimensioned to receive and position die elements 70 and 72. An inwardly projecting flange portion 86 operates to catch the left end of edge of each die element. The sleeve member 82 includes flats on the outer surface to facilitate rotation of the member by standard wrench. To the right of the portion carrying the flat surfaces there is provided a threading shown as 88 on the outer surface of 82 and then a sleeve portion shown as 90 of a substantial length.

A further sleeve member shown as 92 is provided having an inner bore 94 dimensioned to receive in sliding engagement the sleeve portion 90 to align the two sleeve members. The forward portion of bore 94 is threaded as at 96 to mate with the threading 88 of member 82. Sleeve member 92 includes a bore 98 smaller in diameter than bore 94 and extended through the structure to join bore 94 through a transverse surface 100. Fitted within 92 is a clamping sleeve 102 including a portion 104 dimensioned to be slidingly received in bore 98 and to extend substantially therethrough. Element 102 includes a further portion 106 larger in diameter than 104 made to join 104 through a transverse surface 108 engageable with the surface 100. A forward portion of 102 shown as 110 includes an outer threaded surface 112 adapted to mate with the threading of the nut element 44 of half 20 of the connector. Within 110 there is a first bore 114 dimensioned to fit over the portion 26 of the body of half 20 of the connector. A tapered bore shown as 116 extends from bore 114 to a bore 118 extended along the length of 102. A clamping and centering element 120 having an outer diameter and configuration to fit within 102 is provided. The element 120 includes at one end a portion 122 having an outer tapered surface complementary to the taper of bore 116 and an inner bore 124 having a surface configuration complementary to the center conductor of the cable. Slots are provided along each side of 102 as shown by numeral 126 to permit 124 to be closed on the center conductor. At the right end of element 102 is provided a nut 128 internally threaded to mate with threads 130 on a portion extended out of 120 and headed as at 132 by a bolt head or the like containing flats or surfaces otherwise positioned to facilitate the application of a wrench to rotate the element 120 and adjust its position axially relative to 102.

Referring now to FIG. 6, there is an identity of elements 70, 72, 82 and 92 in the assembly used for half 22 which are used with a holder 134 fitted within 92, as shown. The holder includes a portion 136 which is slidable within bore 98 of 92. A flange surface provided by a nut 138 limits the axial position of 134 in 92. Attached to 138 is a forward assembly including a tubular portion 140 which has a threaded bore therein 142 of a diameter to receive the center conductor 16 of the cable and support such concentrically during application of the forces to deform the ferrule 68. The outer diameter of 140 is controlled to provide a sliding fit within the bore 54 of 52. An enlarged portion 146 of 140 is made to rest and bottom against a right-angle surface at the bottom of bore 62 to control the position of 52 relative to 134. The element 140 includes attached thereto a nut shown as 148 having threading as at 150 mateable with the threading on the body element of the connector half. The length of 140 is controlled so that the right end face abutts the end of the cable and a portion of the end of the ferrule 68 as shown in FIG. 6. The forward portion of 140 is separated as at 147 and includes a threaded portion 149 with threading of a pitch to match the pitch of 150 so that once the half 52 is locked to the cable the tool can be removed without stripping the threading on the center conductor.

OPERATION

To terminate a connector half 20 to a cable end the ferrule 36 is first positioned on the cable and then the body 24 is moved into the position generally shown in FIGS. 2 and 5. The clamping assembly 102 is then threaded into the nut 44 of half 20 causing the end of 120 to bear against the end of the cable and the end of 26. This draws the body into a precise position on the cable with the end of the cable and the end of 26 flush. As this occurs the taper of 122 and the surface 116 cause 120 to grip the cable center conductor looking the half 20 into a proper position on the cable in an axial sense and holding the center conductor concentric during subsequent deformation of 36.

Next element 82 is positioned over the assembly and back to the left of the position shown in FIG. 5 with die elements 70 and 72 then being fitted on the cable outer conductor. Element 82 is then drawn up generally to the position shown in FIG. 5 with 92 then being threaded thereover. As the elements 82 and 92 are relatively rotated the die element portions 76 carrying die surfaces 80 are driven inwardly to deform 36 against the surface 32. Continued relative rotation of elements 82 and 92 causes the die surfaces 80 to axially deform the ferrule 36 from the configuration shown in FIG. 3 to the configuration shown in FIG. 4. At this time the surface 78 engages the end surface of 52 to stop movement of the dies relative to the body of half 20. As will be discerned, by a comparison of FIGS. 3 and 4, the ferrule is very substantially compressed in an axial sense. The slight deformation shown in FIG. 4 of the body 24 of half 20 and of the outer conductor of the cable is, in fact, exaggerated. In accordance with the concept of the invention, this deformation is carefully controlled to provide enough residual stress in the body and in the cable to mechanically lock the body to the cable without deforming the inner surface of the cable and thereby creating a discontinuity. By having the volume of the ferrule in its undeformed state approximately that of the cavity defined by the outer conductor and the bore 30 concentrated loading caused by buckling of the ferrule is avoided or at least minimized. At the same time a broad area of engagement and loading of the body and the outer conductor of the cable is assured. The considerable deformation of the ferrule tends to work harden the material thereof to further assure that it will maintain its deformed configuration in use to maintain an elastic reserve of inward and outward forces creating hoop stresses holding the members together. The broad area of contact provided by the invention ferrule structure in conjunction with the extent of deformation thereof also assures a good electrical interface between the conductive elements of the cable and connector. While the ferrule 36 is shown as an integral structure the invention contemplates the use of two or three or more cylindrical tubular members. The dotted lines in FIG. 3 represent how a composite ferrule made of three rings would be utilized. Experience, in fact, has shown that some increase in tensional holding is achieved by the use of a composite ferrule structure.

After deformation of the ferrule and termination of half 20 to the cable, as shown in FIG. 5, the elements 82 and 92 are rotated relative to each other with the element 92 being removed from the assembly of parts. The element 82 is then displaced axially to the left to expose the die elements 70 and 72, which are then removed and then the element 82 is pulled off to the right, the aperture 87, clearing the outside diameter of the nut part of half 20. Next, element 102 is rotated and backed off from half 20 of the connector, the clamp 124 releasing the center conductor as this is accomplished.

With regard to half 22 shown in FIG. 6, the ferrule 68 is first positioned on the cable with the plug body then being positioned thereon in the general arrangement shown in FIG. 6. Element 134 is then threaded onto half 22 until the forward portion thereof bottoms against the end of the cable and ferrule 68 to properly position the connector, ferrule and cable elements. The center conductor is made to rest within 142 and to be held concentric during deformation of 68. Next, element 82 is slipped back over the cable to a point permitting the die elements 70 and 72 to be fitted on the cable with element 82 being drawn up until the leading portions 76 are within bore 66. Element 92 is then threaded onto 82 into the position shown in FIG. 6. Thereafter, elements 92 and 82 are relatively rotated to cause the die elements to be driven to the left deforming the ferrule 68 and terminating half 22 of the connector to the cable. As in the previous case surface 78 eventually bottoms against the right-hand end of body 52 to limit deformation of the ferrule 68. Following termination of half 22 in this manner element 92 is removed followed by removal of 82, 70 and 72 and removal of element 134.

As one aspect of the invention it is to be noted that the end of ferrule 68 forms part of the surface defining the outer conductive surface for signal transfer. It is contemplated that connectors or devices utilizing the invention may incorporate this feature to provide a reduction in length of the body thereof where overall length must be minimized.

As an important aspect of the invention, FIG. 1 reveals that a visual inspection can be made of a connector to ascertain that a ferrule is in place and that deformation has been properly made. With prior art devices utilizing collets or the like for terminating coaxial cable visual observation of proper use is not practical.

Figure 8:
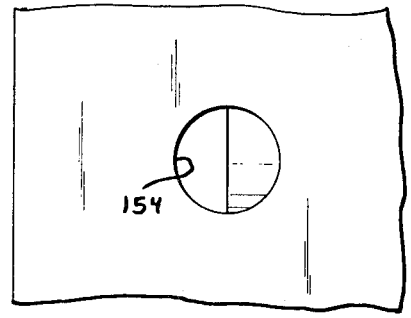
FIG. 8 is an enlarged partial view of the connector of FIG. 7 through the inspection port indicating proper and improper ferrule deformation.

Turning to a further aspect of the invention, the connector of the invention may be made to include other means to provide a ready check of proper termination. FIG. 7 shows a connector spliced 152 in accordance with the invention, including inspection port 154 and 156 in each end. FIG. 8 shows the port 154 enlarged. As can be discerned, the ferrule is properly positioned so inspection of the splice can be made quickly and visually. Excessive deformation would result in more or very little of the ferrule appearing through the port and insufficient deformation would result in an exposure of ferrule filling or nearly filling the port.

Figure 9:
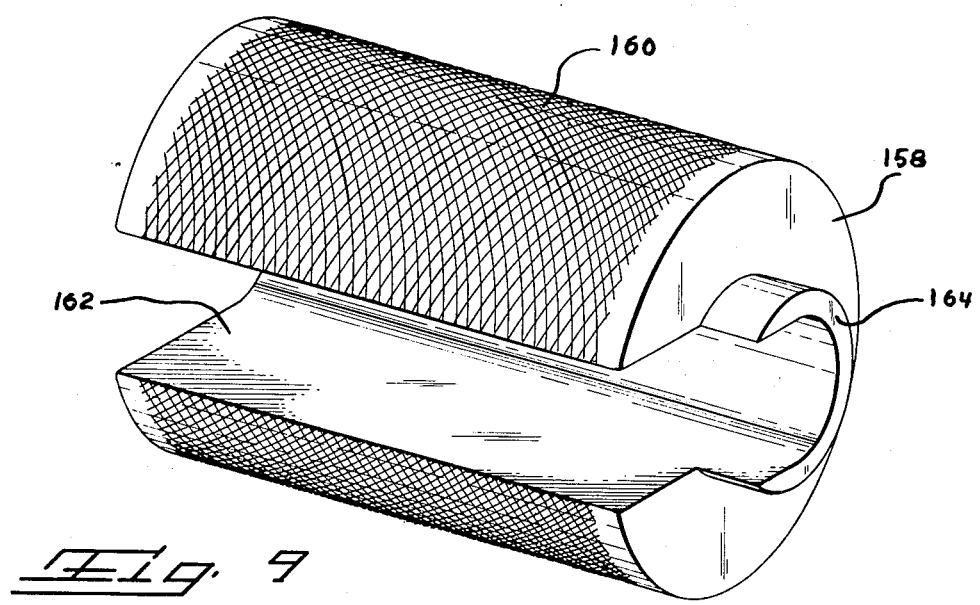
FIG. 9 is a perspective view of a gauging tool useful with the invention connector.

FIG. 9 depicts a gauge 158 which can be used for more accurately measuring the extent of deformation if visual inspection is not feasible or if visual inspection indicates that deformation control is marginal. The gauge 158 includes a body 160 having a longitudinal slot 162 leading to a portion radiused to fit the cable. The forward end of 158 includes a projecting portion 164 of a proper depth and thickness to be fitted into the bore of a connector half to gauge the extent of ferrule deformation.

While not shown, it is contemplated that the present invention could be used with connectors having center contact pin members attached onto the cable center conductor of both halves.

In an actual embodiment for use with a coaxial cable having an outer conductor of hard copper of an outer diameter of 0.141 inch, bore 30 was made to have a diameter of approximately 0.180 inch and a length of approximately 0.171 inch. The body of half 20 was, in the actual embodiment, comprised of beryllium copper. The ferrule 36 was, in the actual embodiment, comprised of a solid sleeve of dead soft copper, 0.160 inch in length, 0.177 inch in outer diameter and 0.0165 inch in thickness. It was deformed to approximately 0.107 inch. The actual example achieved a pull test reading 82 pounds tensile with a deformation of the cable outer inner surface of less than 0.001 inch diameter change.

Having now disclosed the invention in terms intended to enable a preferred practice thereof in various modes, I define what is asserted as inventive through the appended claims.

What is claimed is:

1. A tool useful for terminating high frequency coaxial cable to a connector having a bore therethrough via a cylindrical ductile ferrule member, which comprises:
    (a) first means operable to position said connector over said coaxial cable at one end thereof;
    (b) second means operable to drive said cylindrical ductile ferrule member surrounding said coaxial cable into inelastic deformation within a bore of said connector, said deformation causing permanent residual stresses in said ferrule member thereby locking said coaxial cable mechanically and electrically to said connector; and
    (c) third means operable to control the extent of deformation of said ferrule member to minimize deformation of said coaxial cable.

2. The tool of claim 1 wherein said first and second means includes dies and a sleeve removable from said connector after deformation of said ferrule member to leave the end of said ferrule member exposed for inspection purposes.

3. The tool of claim 1 wherein second means is comprised of a pair of dies having inner surfaces made to surround the cable outer conductor and end surfaces made to engage the entire end surface of the ferrule member.

4. The tool of claim 1 including further means adapted to grip the center conductor of the cable and hold said center conductor fixed axially and concentrically during the deformation of said sleeve member whereby to accurately position said fitting and ferrule member relative to the end of the cable.

5. The tool of claim 1 wherein the said first means includes a sleeve adapted to be inserted within the said fitting to engage at least a portion of the said ferrule member and the end thereof opposite to the end engaged by the said second means to hold said ferrule member during deformation.

6. The tool of claim 1 wherein said third means is comprised of a surface extending from a portion of said second means defining die surfaces and operable to stop movement of said die surfaces by engagement with a portion of said fitting.

References Cited

UNITED STATES PATENTS

| | | | |
|---|---|---|---|
| 1,639,173 | 8/1927 | Fountain | 29—237 |
| 2,086,703 | 7/1937 | Eastman | 29—237 |
| 2,975,662 | 3/1961 | Courtot | 29—237 |
| 3,201,859 | 8/1965 | Stanley | 29—237 |
| 3,180,659 | 4/1965 | Vigneron | 285—27 |
| 3,484,921 | 12/1969 | Ziegler, Jr. | 29—203 H |
| 3,609,651 | 9/1971 | Sladek et al. | 339—276 T |
| 3,674,292 | 7/1972 | Demler | 29—237 |

CHARLES W. LANHAM, Primary Examiner

D. C. CRANE, Assistant Examiner

U.S. Cl. X.R.

29—237, 282